(12) United States Patent
Ohwa (10) Patent No.: US 7,697,038 B2
(45) Date of Patent: Apr. 13, 2010

(54) IMAGING APPARATUS AND METHOD FOR CONTROLLING THEREOF AND IMAGING SYSTEM

(75) Inventor: Yasushi Ohwa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 497 days.

(21) Appl. No.: 11/772,650

(22) Filed: Jul. 2, 2007

(65) Prior Publication Data

US 2008/0002036 A1      Jan. 3, 2008

(30) Foreign Application Priority Data

Jul. 3, 2006      (JP)      ............................. 2006-183848

(51) Int. Cl.
     *H04N 5/228*      (2006.01)
(52) U.S. Cl. .................... 348/222.1; 348/302; 348/296; 348/371; 250/208.1; 257/291
(58) Field of Classification Search .............. 348/222.1, 348/302, 296, 371; 250/208.1; 257/291
     See application file for complete search history.

(56) References Cited

U.S. PATENT DOCUMENTS 7,209,170 B2 *     4/2007     Nishino et al. .............. 348/302

FOREIGN PATENT DOCUMENTS

JP     2005-094142     4/2006

* cited by examiner

*Primary Examiner*—Jason Chan
*Assistant Examiner*—Usman Khan
(74) *Attorney, Agent, or Firm*—Cowan, Liebowitz & Latman, P.C.

(57) ABSTRACT

An imaging apparatus comprises an image sensing unit in which a plurality of photoelectric conversion elements are arranged on an image sensing plane, and a control unit. The control unit has a first mode in which image signals are read out from a first photoelectric conversion element group arranged in a first region of the image sensing plane, and a second mode in which image signals are read out from a second photoelectric conversion element group arranged in a second region that is smaller than the first region of the image sensing plane In addition, the control unit performs control such that a readout period of a line arranged on the image sensing plane in the first mode is substantially equal to that of a line arranged on the image sensing plane in the second mode when switching between the two modes.

9 Claims, 13 Drawing Sheets

IMAGING APPARATUS AND METHOD FOR CONTROLLING THEREOF AND IMAGING SYSTEM

BACKGROUND OF THE INVENTION

1. Field of the Invention

The present invention relates to an imaging apparatus having photoelectric conversion elements and a method thereof and image sensing system, and more particularly to high-quality electronic zoom utilizing a CMOS image sensor.

2. Description of the Related Art

Conventionally, CCD image sensors and CMOS image sensors are widely used as solid-state image sensing elements. In a CCD image sensor, a photoelectric conversion element arranged in each pixel of the image sensing plane converts light into signal charges. The signal charges are read out from all pixels to the CCD simultaneously and transferred. The CCD image sensor converts the transferred signal charges into an electrical signal and outputs it. In a CMOS image sensor, a photoelectric conversion element arranged in each pixel of the image sensing plane converts light into signal charges. The signal charges are amplified in each pixel and output. As characteristic features, the CMOS image sensor can selectively read out (to be referred to as "partial readout" hereinafter) image signals of photoelectric conversion elements in an arbitrary pixel region, unlike the CCD image sensor that simultaneously reads out image signals of photoelectric conversion elements for an entire pixel region (Japanese Patent Laid-Open No. 2005-94142).

Figure 1A:
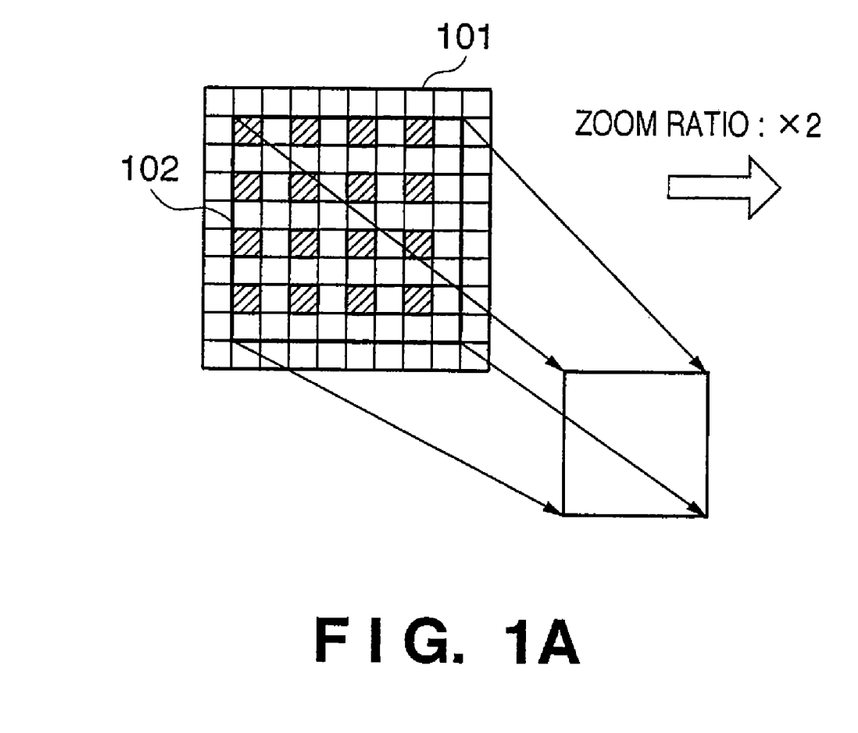
FIG. 1A is an overall diagram showing an electronic zoom operation utilizing features of a CMOS image sensor.
Figure 1B:
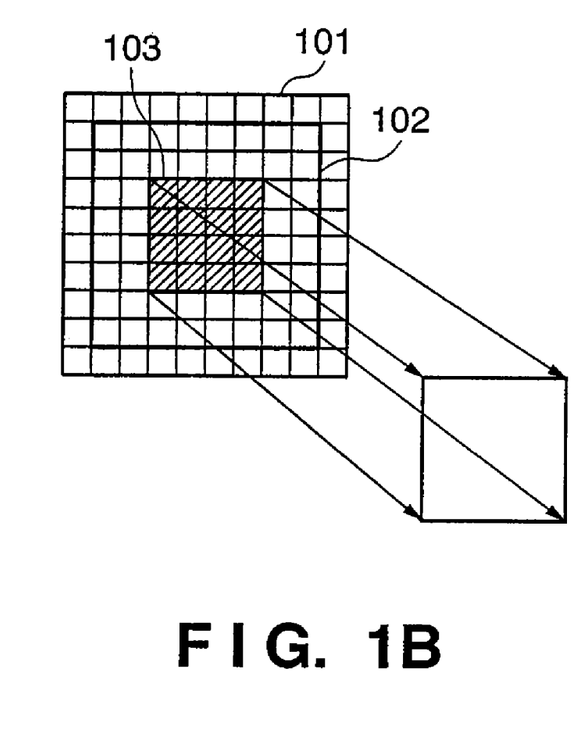
FIG. 1B is an overall diagram showing an electronic zoom operation utilizing features of a CMOS image sensor.

FIGS. 1A and 1B are overall diagrams showing an electronic zoom operation utilizing the features of a CMOS image sensor. FIG. 1A shows readout in a normal mode. FIG. 1B shows readout in a 2× zoom mode. Referring to FIGS. 1A and 1B, an imaging unit 101 has a plurality of pixels arrayed in a matrix. FIGS. 1A and 1B illustrate an example of an imaging unit having 10×10 pixels. However, the imaging unit need not always include 10×10 pixels and can have an arbitrary number of pixels.

In the normal mode, the CMOS image sensor executes readout at a thinning ratio of 2; that is, it reads out 4×4 alternate pixels in a range indicated by a bold frame 102 including 8×8 pixels, as shown in FIG. 1A. In the zoom mode, the CMOS image sensor reads out 4×4 pixels continuously arranged at a central portion 103 in the bold frame 102 including 8×8 pixels. In this case, it is possible to display an enlarged image of the central portion 103 by readout at a thinning ratio of 1. Since the number of pixels read out in the zoom mode is equal to that in the normal mode, it is unnecessary to increase the number of pixels by signal processing. This enables high-quality electronic zoom.

Figure 2:
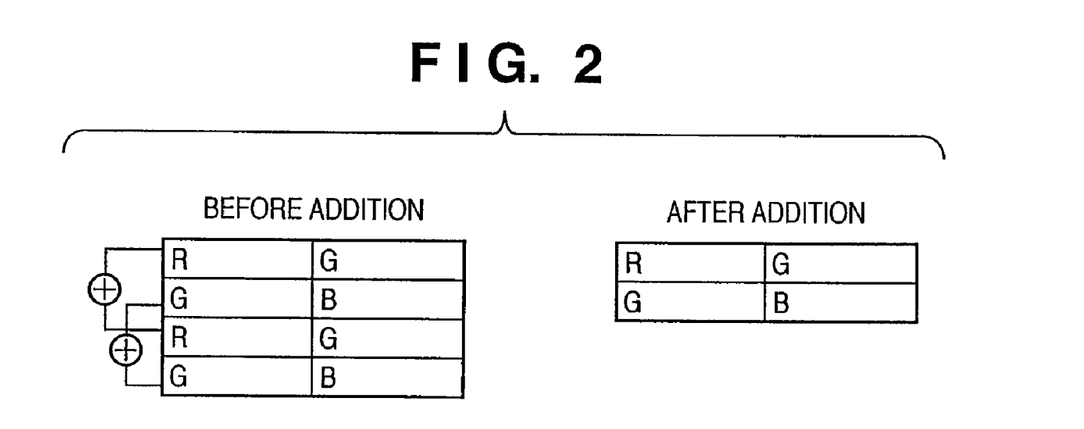
FIG. 2 is a diagram showing differences between line storage periods in the case of an addition average of two horizontal pixels.
Figure 9:
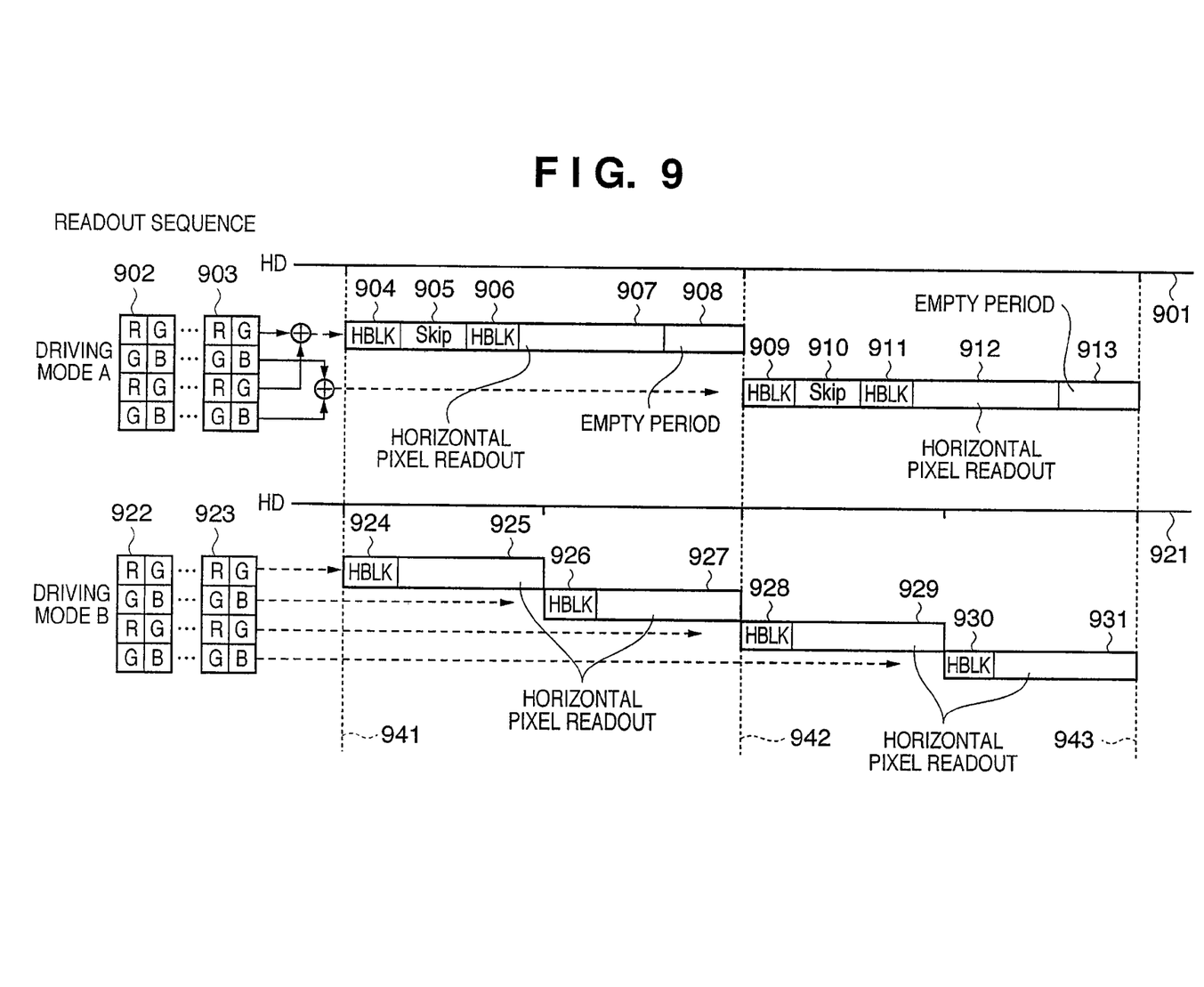
FIG. 9 is a diagram showing a readout sequence in a case where timing adjustment is performed by inserting an empty period.
Figure 11:
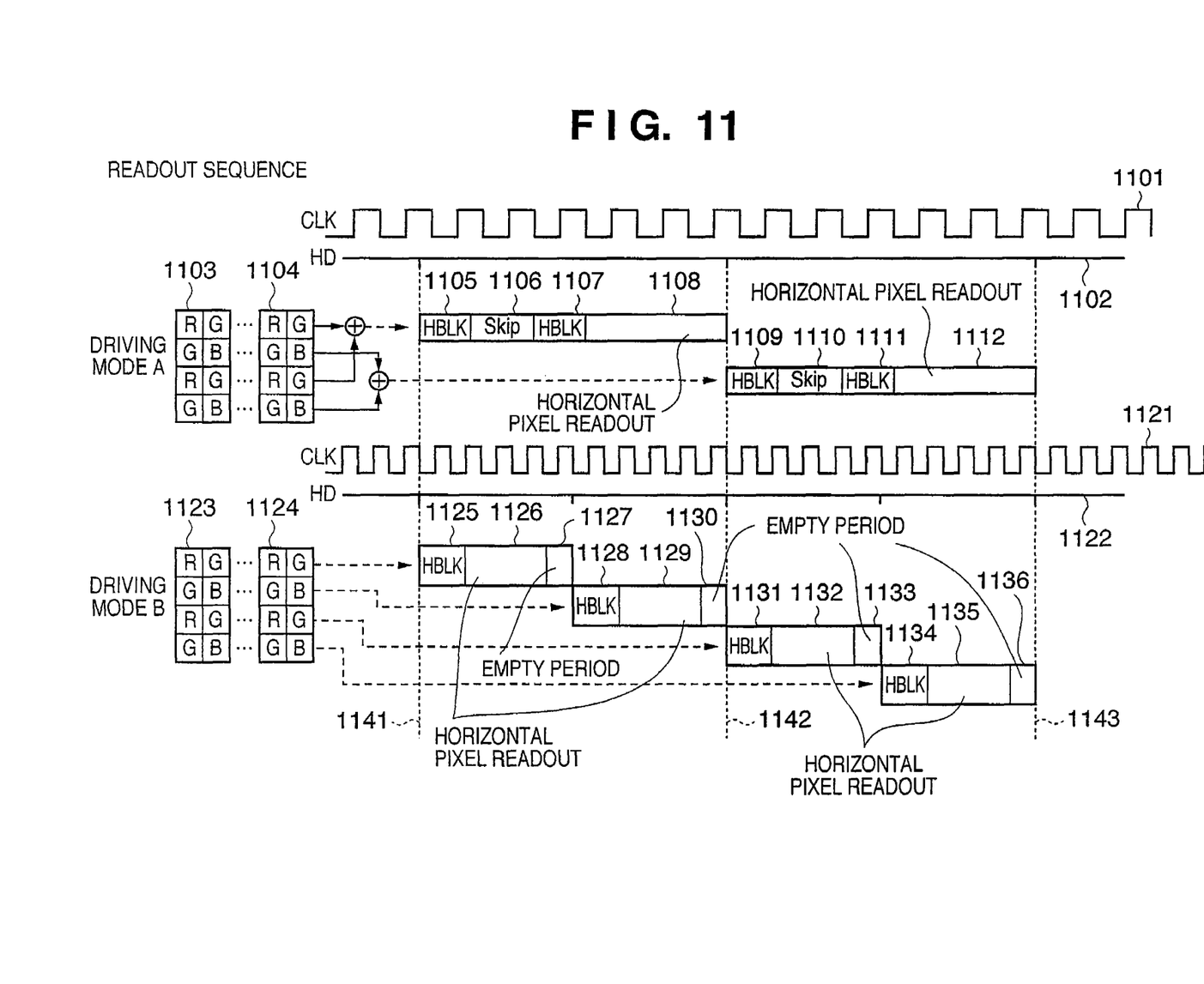
FIG. 11 is a diagram showing a readout sequence in a case where timing adjustment is performed by changing clock frequency and inserting an empty period.

However, in storing signal charges in the CMOS image sensor, the signal charge storage period shifts between the lines of the image sensing plane. This storage time shift between the lines causes a shift of the readout period of one line. The readout period of one line—that is, the period from the start of image signal readout of one line to the start of image signal readout of another line—is given by $$\text{Readout period of one line} = HBLK \times \alpha + \text{Skip} \times \beta + \text{the number of horizontal pixels} \times \text{reference clock time} \quad (1)$$

where $\alpha$ and $\beta$ are determined by the addition method in the vertical direction. HBLK is the horizontal blanking period. Skip is a period (skip period) necessary for skipping one line by thinning. (The number of horizontal pixels×reference clock time) corresponds to a vertical pixel readout period shown in FIGS. 9 and 11. As indicated by equation (1), the readout period of one line is represented by the sum of three periods: horizontal blanking period, skip period, and horizontal pixel readout period. Addition average of two vertical pixels will be explained as an example with reference to FIG. 2.

Figure 3:
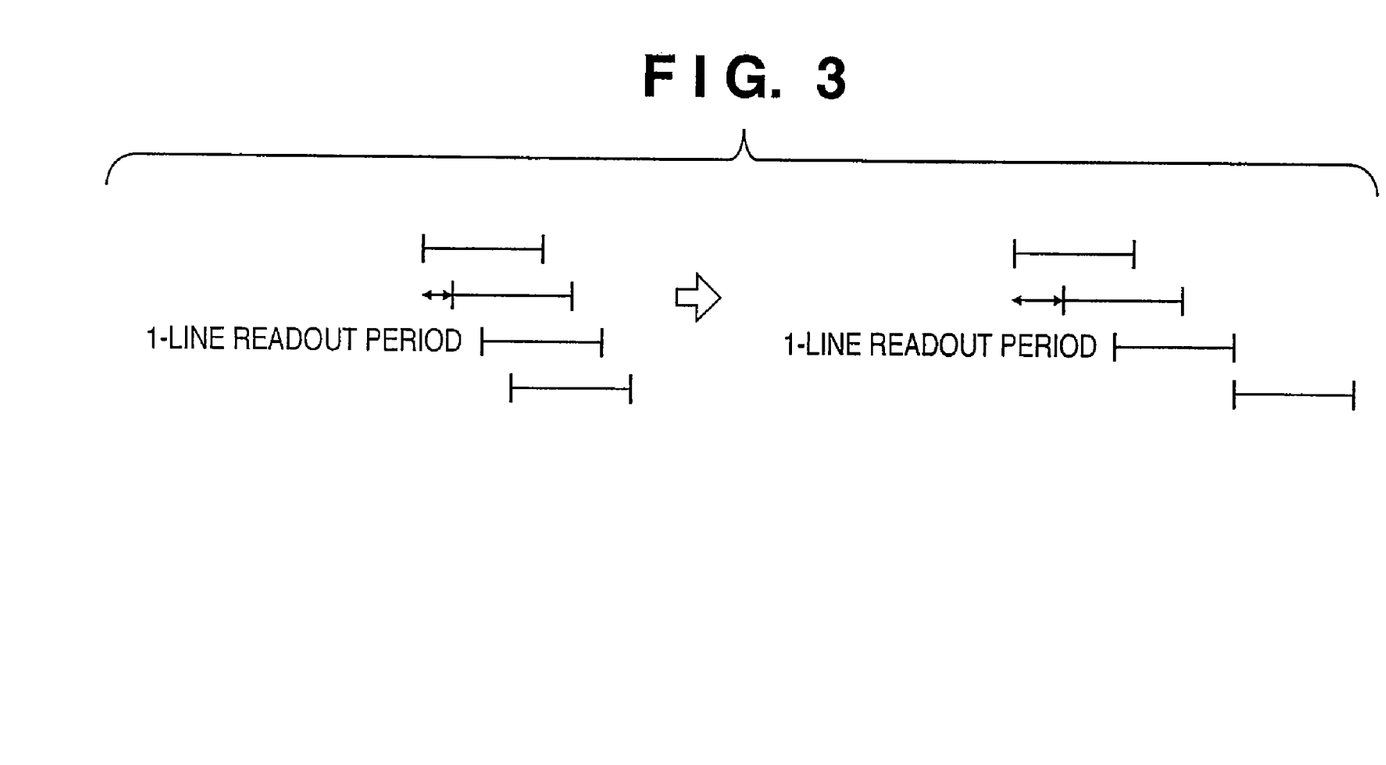
FIG. 3 is a diagram showing a rolling shutter operation when changing driving modes.

In the example shown in FIG. 2, $\alpha$ is 2, and $\beta$ is 1. The time necessary for transferring horizontal pixels depends on the reference clock time. The readout period of one line can change depending on the addition method in the vertical direction or due to changes in a driving mode such as a driving frequency. The storage start times at the top and bottom of the image sensing plane can vary due to changes in a driving mode. FIG. 3 is a diagram showing a rolling shutter operation when changing the driving mode. FIG. 3 shows an example when the readout period of one line is longer than that before changing the driving mode. In the example shown in FIG. 3, the storage time difference between the top and bottom of the screen is larger than that before changing the driving mode.

Figure 4:
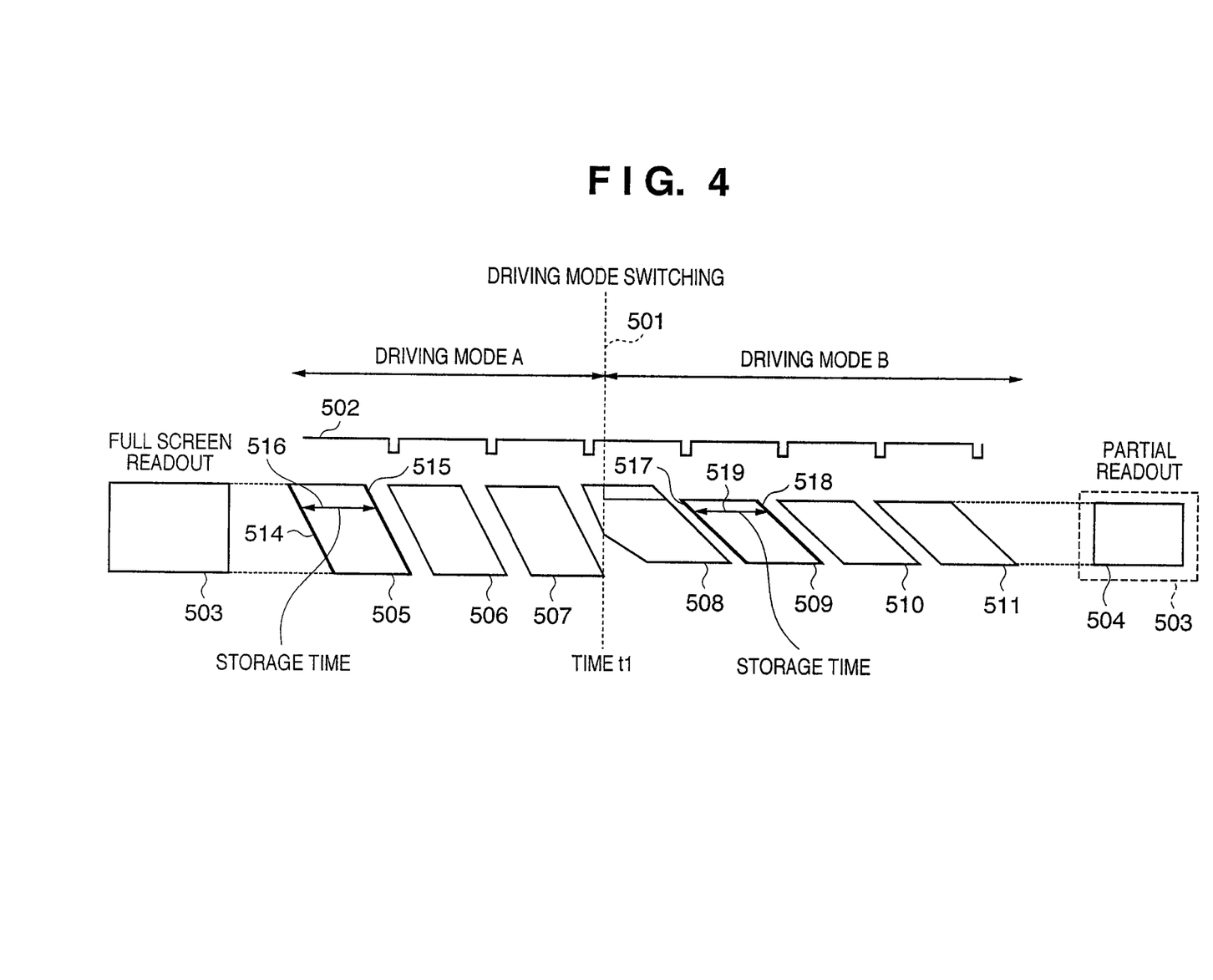
FIG. 4 is an overall diagram showing shifted storage periods at the top and bottom of the screen.

FIG. 4 shows an example when the driving mode changes in EVF (Electronic ViewFinder) display or a moving image process such as moving image recording. Note that the driving mode changes at a timing during the VBLK (vertical blanking) period after readout finishes.

In FIG. 4, the abscissa represents the time, and the ordinate represents the readout position in the CMOS image sensor. Frames 505 to 511 represent storage timings and storage times at line positions in each driving. FIG. 4 shows the storage times of the frames 505 to 511 when the CMOS image sensor is driven in a driving mode A up to a time t1 (501) and then driven in a driving mode B from the time t1 (501). Reference numeral 502 indicates a vertical synchronous signal VD. In the driving mode A, the sensor executes full screen readout 503. In the driving mode B, the sensor executes partial readout 504. In the frame 505 in the driving mode A, a time from a reset timing 514 to a readout timing 515 corresponds to a storage time 516. Similarly, in the frame 509 in the driving mode B, a time from a reset timing 517 to a readout timing 518 corresponds to a storage time 519. This also applies to the frames 506 and 507 in driving mode A and the frames 510 and 511 in the driving mode B.

Since the reset start time in the frame 508 is earlier than the time t1, the reset timing in the period before the time t1 is the same as in the driving mode A. From the time t1, the mode changes to the driving mode B. For this reason, the readout timing is different from that in the driving mode A. As a result, in the frame 508 upon drive switching, the storage time difference between the top and bottom of the screen changes from the switching time t1.

SUMMARY OF THE INVENTION

The present invention is provided to maintain the storage time of the imaging unit regardless of driving modes.

A first aspect of the present invention is an imaging apparatus which comprises an image sensing unit in which a plurality of photoelectric conversion elements are arranged on an image sensing plane, and a control unit, wherein the control unit has a first mode in which image signals of each of the M lines in a first photoelectric conversion element group arranged in a first region of the image sensing plane are read out from the image sensing unit, and a second mode in which image signals of each of the N lines in a second photoelectric conversion element group arranged in a second region that is smaller than the first region of the image sensing plane are read out from the image sensing unit; wherein, M is an integer greater than N, and N is an integer less than M and greater than or equal to 1, and control is performed to cause a horizontal period of the second mode to be N/M of that of the first mode; wherein, the horizontal period of the first mode is a period from the start of image signal readout of a predetermined line to the start of the image signal readout of a next predetermined line; and, wherein the horizontal period of the second mode is a period from the start of image signal readout of a predetermined line to the start of the image signal readout of a next predetermined line.

A second aspect of the present invention is an imaging system which comprises an optical system, and an imaging apparatus. The imaging apparatus includes, an image sensing unit in which a plurality of photoelectric conversion elements are arranged on an image sensing plane, and a control unit; wherein, the control unit has a first mode in which image signals are read out from one of M lines in a first photoelectric conversion element group arranged in a first region of the image sensing plane, and a second mode in which image signals are read out from one of N lines in a second photoelectric conversion element group arranged in a second region that is smaller than the first region of the image sensing plane; wherein M is an integer greater than N, and N is an integer less than M and greater than or equal to 1, and control is performed to cause a horizontal period of the second mode to be N/M of a horizontal period of the first mode; wherein, the horizontal period of the first mode is a period from the start of image signal readout of a predetermined line to the start of the image signal readout of a next predetermined line; and wherein the horizontal period of the second mode is a period from the start of image signal readout of a predetermined line to the start of the image signal readout of a next predetermined line.

A third aspect of the present invention is a method for controlling an imaging apparatus that comprises an image sensing unit in which a plurality of photoelectric conversion elements are arranged on an image sensing plane, and a control unit, wherein the control unit has a first mode in which image signals of each of the M lines in a first photoelectric conversion element group arranged in a first region of the image sensing plane are read out from the image sensing unit; and a second mode in which image signals of each of the N lines in a second photoelectric conversion element group arranged in a second region that is smaller than the first region of the image sensing plane are read out from the image sensing unit, wherein M is an integer greater than N, and N is an integer less than M and greater than or equal to 1, the method comprising a step of: performing control to cause a horizontal period of the second mode to be N/M of that of the first mode, wherein the horizontal period of the first mode is a period from the start of image signal readout of a predetermined line to the start of the image signal readout of the next predetermined line, and the horizontal period of the second mode is a period from the start of image signal readout of a predetermined line to the start of the image signal readout of a next predetermined line.

Further features of the present invention will become apparent from the following description of exemplary embodiments with reference to the attached drawings.

DESCRIPTION OF THE EMBODIMENTS

Hereinafter, preferred embodiments of the present invention will be described in detail with reference to the accompanying drawings.

First Embodiment

Figure 5:
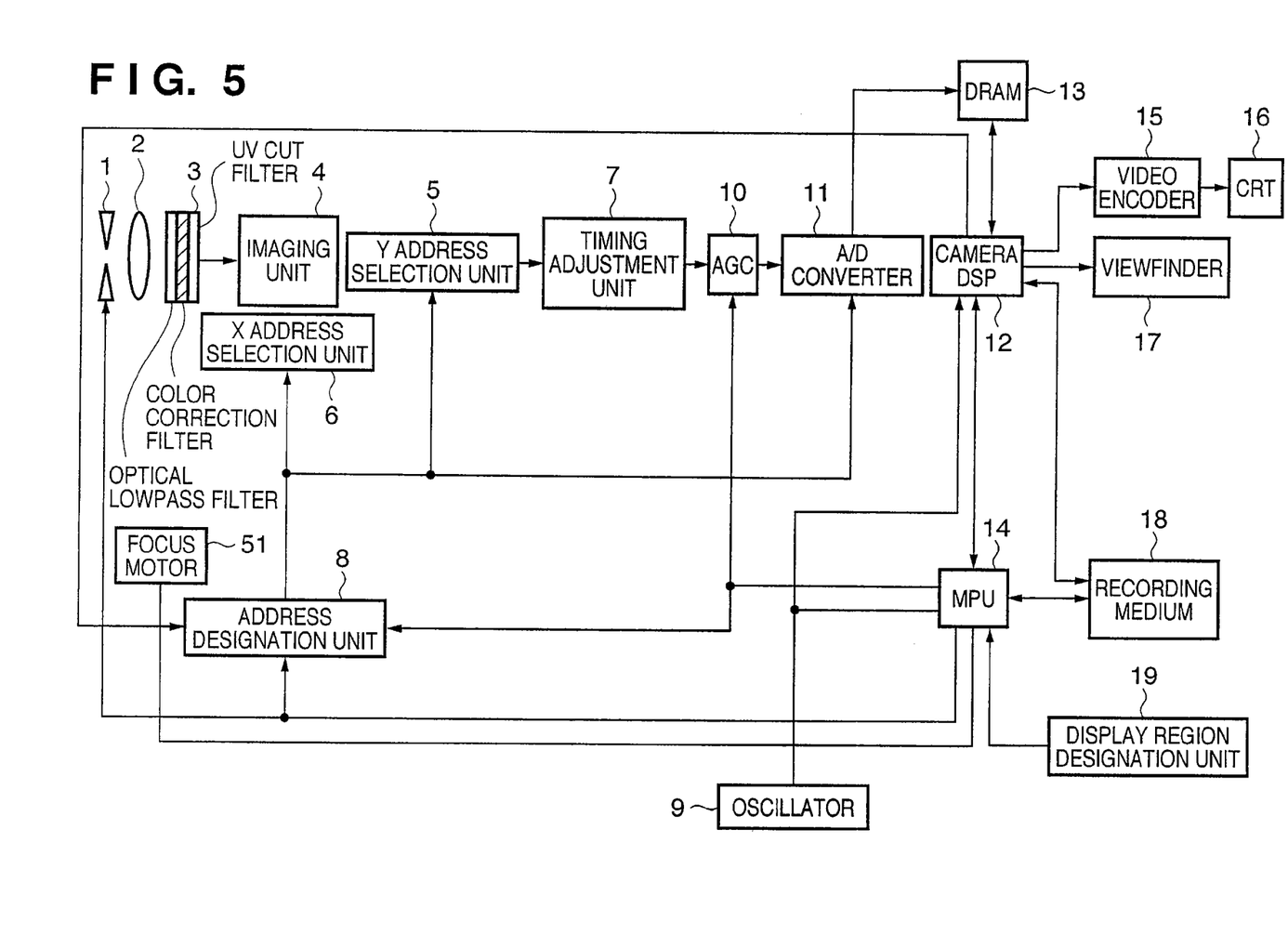
FIG. 5 is a diagram showing a schematic configuration of an imaging system according to a preferred embodiment of the invention.

FIG. 5 is a diagram showing a schematic configuration of an imaging system according to the first embodiment of the present invention. This system executes photoelectric conversion by causing light from an object to pass through diaphragm blades 1 and form an image on an imaging unit 4 via a lens 2. A filter group 3 includes a combination of, for example, an optical lowpass filter that cuts a high-frequency region of light to prevent moiré, a color correction filter, and an infrared cut filter. The imaging unit 4 causes an X address selection unit 6 and a Y address selection unit 5 to two-dimensionally select a pixel in accordance with a signal from an address designation unit 8 and outputs a signal to a timing adjustment unit 7. The timing adjustment unit 7 adjusts the timing of one or a plurality of output signals from the imaging unit 4. An AGC (Auto Gain Controller) 10 controls the voltage of the signal output from the timing adjustment unit 7. An A/D converter 11 converts the signal into a digital signal. A camera DSP 12 processes a moving image or a still image. An MPU 14 serving as a control unit sets, in the camera DSP 12, parameters to be used for image processing or executes an AF/AE operation. A focus motor 51 moves a focus lens (not shown) back and forth to effect the AF operation. A DRAM 13 serves as a temporary storage area for image processing. A recording medium 18 serves as a nonvolatile storage area. Examples of the recording medium 18 are a smart medium, magnetic tape, and optical disk. A video encoder 15 and a CRT 16 display a processed image. A viewfinder 17 using, for example, an LCD is used to confirm the object before storage in the recording medium 18. The output devices are not limited to the CRT 16 and viewfinder 17. For example, a printer is also usable. An oscillator 9 generates a clock signal to be supplied to the camera DSP 12 and MPU 14. A display region designation unit 19 designates a display region to display, for example, on the viewfinder 17, an image read out from the imaging unit 4.

The operation of the photoelectric conversion device according to this embodiment will be described next with reference to FIG. 6. A MOS transistor 158 of a potential barrier operating transfer gate transfers charge stored in a photodiode (to be referred to as a "PD" hereinafter) 150 to a floating diffusion (to be referred to as an "FD" hereinafter) that makes the gate of an amplification MOS transistor 160 float. A reset transistor 157 is a MOS transistor that resets the charge in the PD 150. A line selection MOS transistor 159 connects in series to the amplification MOS transistor 160. The gates of these MOS transistors connect to a transfer signal line 153 to transfer charge in the PD 150, a reset signal line 156 to reset the FD, and a selection signal line 152, respectively. The MOS transistor 158 selected by the transfer signal line 153 transfers the charge stored in the PD 150 to the FD which is reset by the reset transistor 157 turned ON by the reset signal line 156. The source-follower MOS transistor 160 amplifies the charge via the selection MOS transistor 159 selected by the selection signal line 152. The charge is read out to a readout line 154. A plurality of pixels 151 are arrayed in the pixel region of the imaging unit 4. Each pixel includes the PD 150, the MOS transistor 158, the reset transistor 157, the amplification MOS transistor 160, and the MOS transistor 159.

Figure 6:
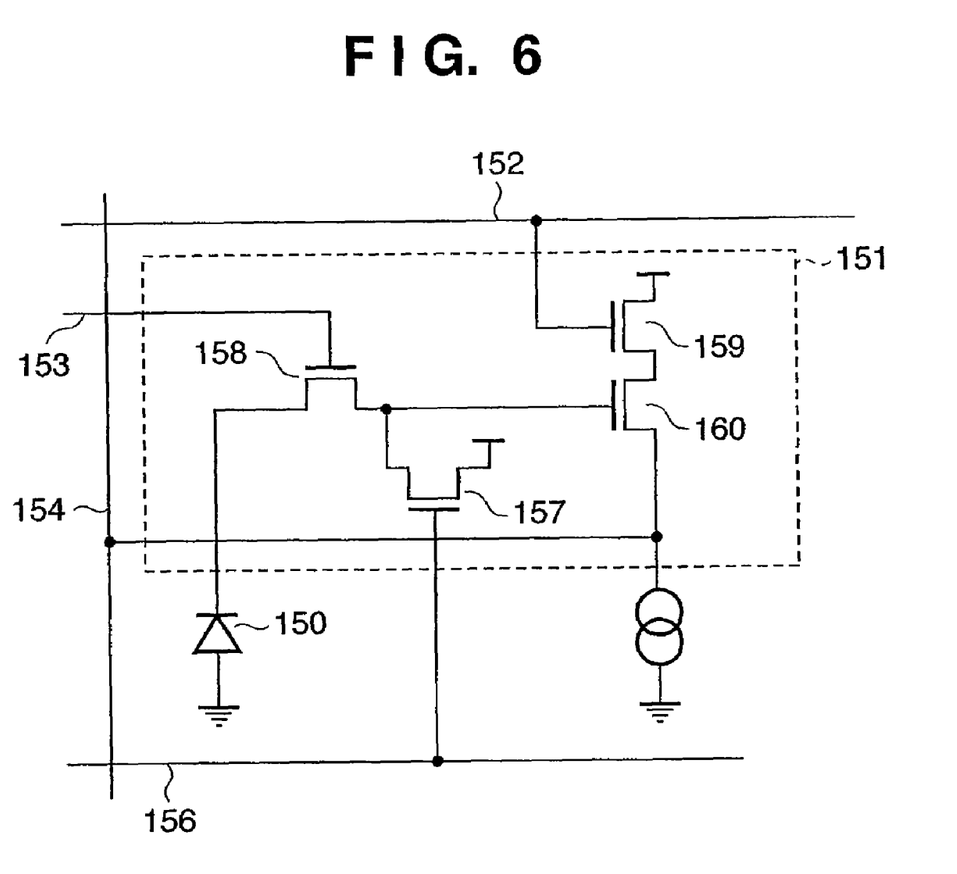
FIG. 6 is a circuit block diagram showing a photoelectric conversion apparatus according to a preferred embodiment of the invention.
Figure 7:
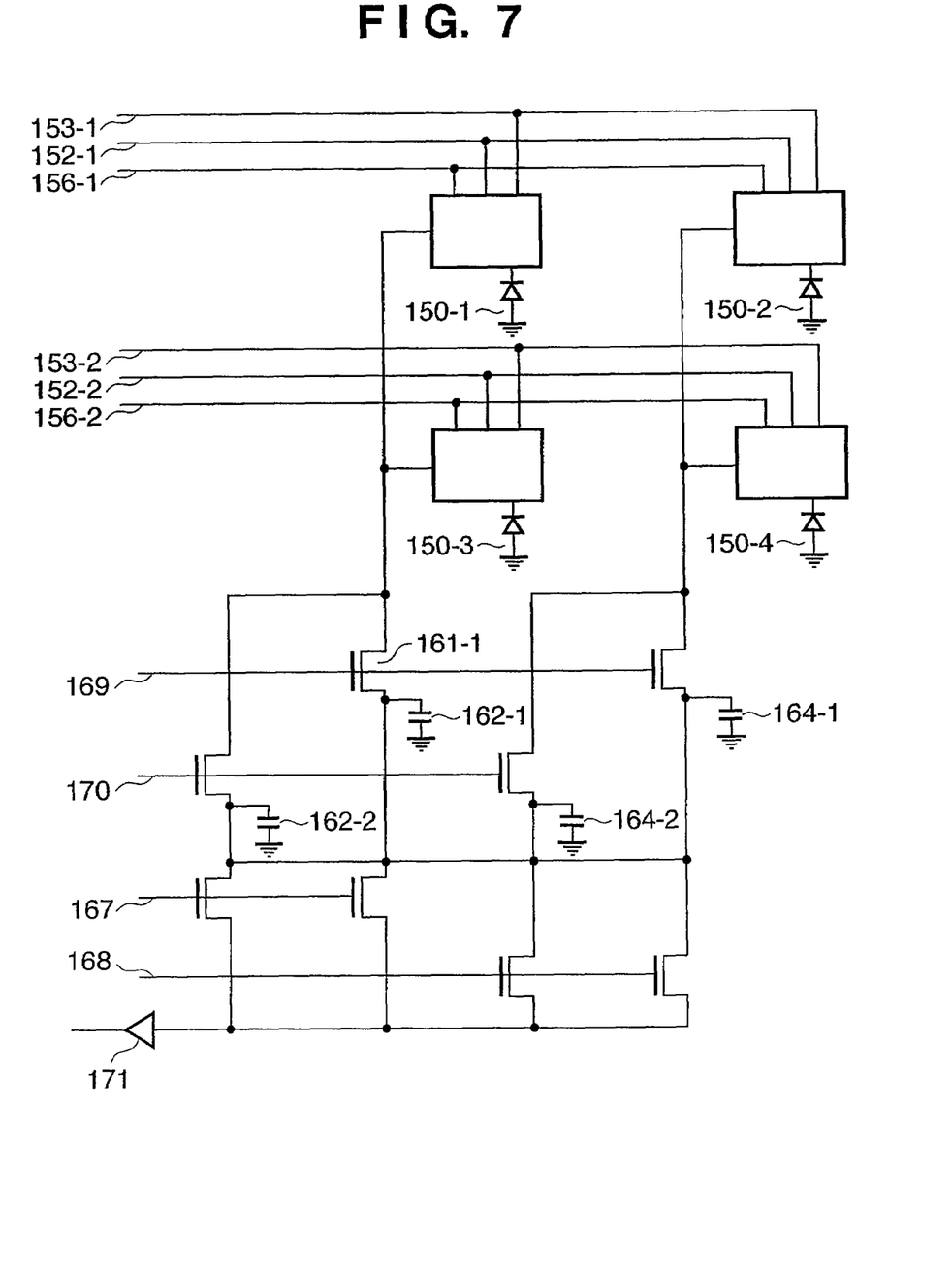
FIG. 7 is a circuit block diagram showing an imaging apparatus according to a preferred embodiment of the invention.

FIG. 7 is a circuit block diagram of an imaging apparatus having a readout circuit and a photoelectric conversion device with a pixel region including the plurality of pixels shown in FIG. 6. FIG. 7 illustrates 2×2 pixels for the sake of simplicity. However, the present invention is not limited to this, and an arbitrary number of pixels can be arranged.

In non-addition control, a capacitor 162-1 stores a charge in a PD 150-1 because a signal line 169 turns on a MOS transistor 161-1 shown in FIG. 7. Similarly, charge in the a PD 150-2 is read out to a capacitor 164-1 upon readout control of the PD 150-1 by signal lines 156-1, 153-1, 152-1, and 169. Image sensing signals in the PDs 150-1 and 150-2 are sequentially read out via an amplifier 171 by alternately turning on signal lines 167 and 168. A vertical operation is performed by controlling signal lines 156-2, 153-2, and 152-2, as in the operation described above.

In addition control, the capacitors 162-1 and 164-1 store charge in the PDs 150-1 and 150-2, respectively, upon controlling the signal lines 156-1, 153-1, 152-1, and 169 shown in FIG. 7. Subsequently, capacitors 162-2 and 164-2 store charge in PDs 150-3 and 150-4, respectively, upon controlling the signal lines 156-2, 153-2, 152-2, and 170. Then, an image sensing signal obtained by adding the charge in the PDs 150-1, 150-2, 150-3, and 150-4 is read out via the amplifier 171 by simultaneously turning on the signal lines 167 and 168. The capacitors 162-1 and 164-1 store the signal charge in the PDs 150-1 and 150-4. Then, an image sensing signal obtained by adding the charge in the PDs 150-1 and 150-4 is read out via the amplifier 171 by simultaneously turning on the signal lines 167 and 168. The above-described control unit can execute non-addition control and addition control.

As a characteristic feature of the present invention, a method of unifying the storage time in a frame when the driving mode changes due, for example, to a change in electronic zoom magnification will be described.

Figure 8:
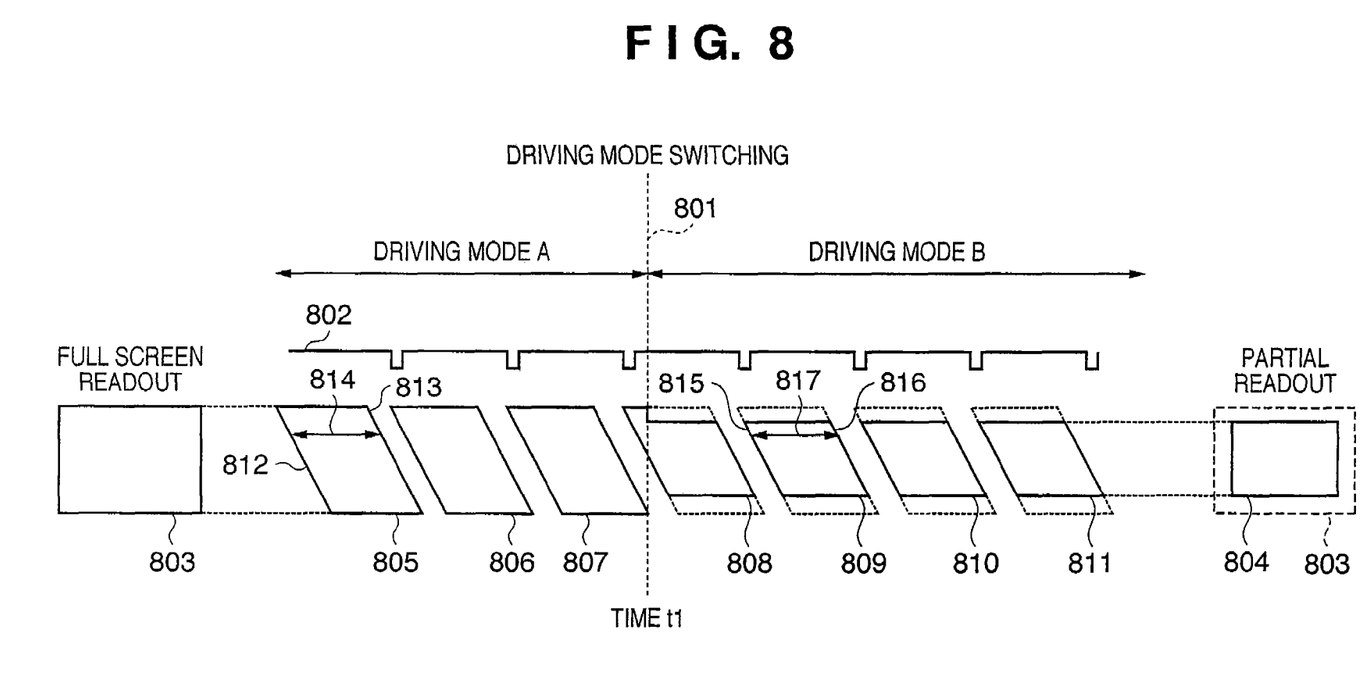
FIG. 8 is an overall diagram showing reset and readout at the same timing in the horizontal position of a CMOS image sensor.

FIG. 8 is an overall diagram showing reset and readout at the same timing in the vertical position of a CMOS image sensor independently of the driving mode. In FIG. 8, the abscissa represents the time, and the ordinate represents the readout position in the CMOS image sensor. FIG. 8 shows storage times (frames 805 to 811) when a driving mode A changes to a driving mode B at a time t1 (801). Reference numeral 802 indicates a vertical synchronous signal VD. In the driving mode A, the sensor executes full screen readout 803. In the driving mode B, the sensor executes partial readout 804. In the frame 805 in the driving mode A, a time from a reset timing 812 to a readout timing 813 corresponds to a storage time 814. Similarly, in the frame 809 in the driving mode B, a time from a reset timing 815 to a readout timing 816 corresponds to a storage time 817. This also applies to the frames 806 and 807 in driving mode A and the frames 810 and 811 in the driving mode B.

FIG. 8 is different from FIG. 4 in that the gradient of the reset timing and readout timing of the frames 808 to 811 after the time t1 is the same as that of the frames 805 to 807 before the time t1. That is, the storage time remains constant in the driving modes A and B. This operation is implemented by executing reset and readout at the same timing in the driving modes A and B based on the vertical position of the CMOS image sensor.

Figure 10:
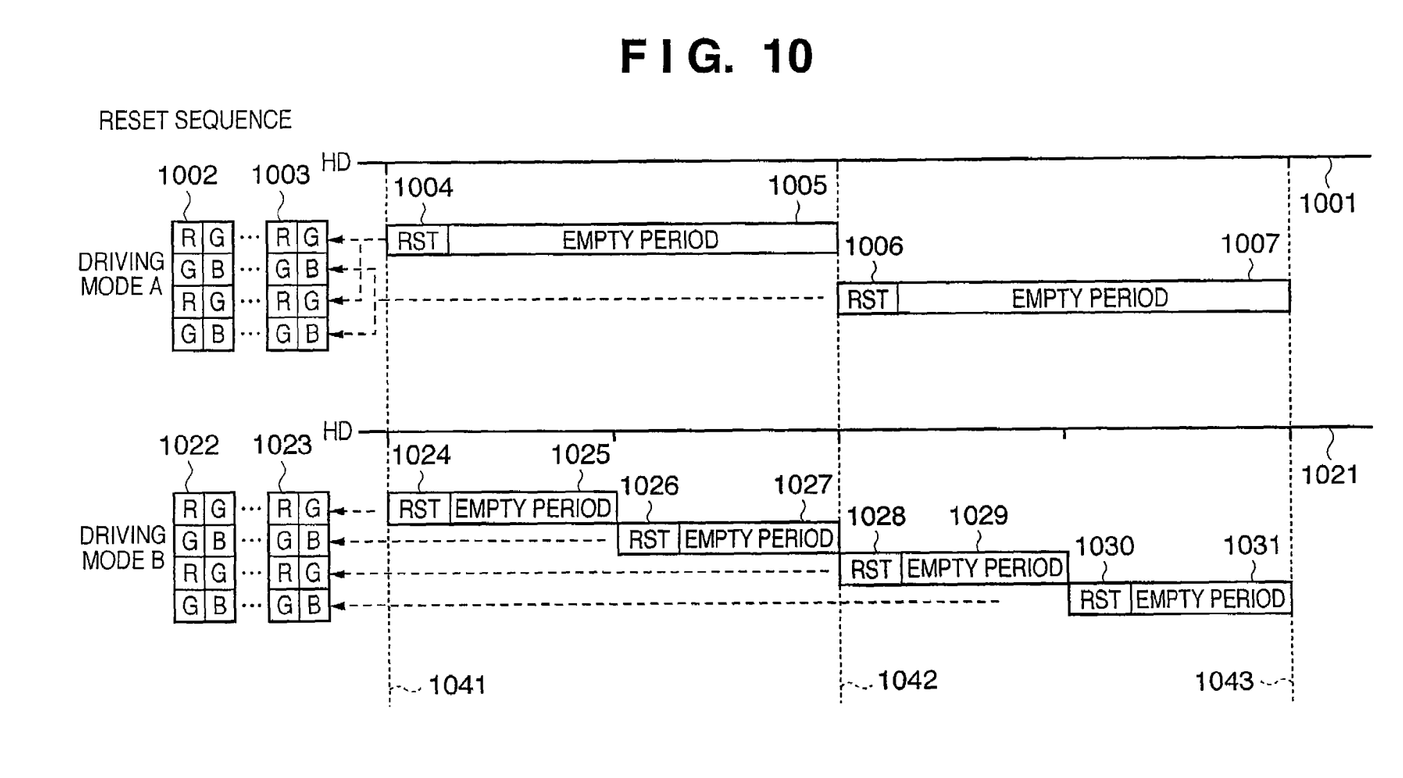
FIG. 10 is a diagram showing a reset sequence in a case where timing adjustment is performed by inserting an empty period.

FIGS. 9 and 10 are diagrams showing a readout sequence and a reset sequence in a case where timing adjustment is performed by inserting empty periods. In FIG. 9, reference numerals 901 and 921 denote a horizontal synchronous signal HD (the time between HD and HD corresponds to the period from the start of image signal readout of one line to the start of the next image signal readout of another line). Parts 902, 903, 922, and 923 of the pixel region of the imaging unit 4 include blocks repetitively containing R, G, G, and B pixels. The 1-line readout sequences in the driving mode A include periods 904 to 908 and periods 909 to 913, respectively. The 1-line readout sequence in the driving mode B include periods 924 to 927 and periods 928 to 931, respectively. The periods 904, 906, 909, 911, 924, 926, 928, and 930 are horizontal blanking periods (HBLK). The periods 905 and 910 are periods (Skip) necessary for thinning out one line. The periods 907, 912, 925, 927, 929, and 931 are horizontal readout periods represented by the number of horizontal pixels×reference clock time. The periods 908 and 913 are empty periods.

The electronic zoom magnification in the driving mode B is twice that in the driving mode A. That is, a bold frame 102 in FIG. 1A indicates the readout region in the driving mode A, while a central portion 103 in FIG. 1B indicates the readout region in the driving mode B. In the driving mode A, the period required for readout of one horizontal line includes the periods 904 to 907. In the driving mode B, the period required for readout of one horizontal line includes the periods 924 and 925. Hence, the period required for readout of one horizontal line in the driving mode A is longer than the period required for readout of one horizontal line in the driving mode B. On the other hand, the number of vertical readout lines in the driving mode A is ½ that in the driving mode B. The vertical readout period is longer in the driving mode B that in the driving mode A. For this reason, in the driving mode A, the empty periods 908 and 913 are inserted in the readout sequence in correspondence with periods 941 to 942 and 942 to 943 of two lines in the driving mode B. Hence, it is possible to execute readout at almost the same timing based on the vertical position in the driving modes A and B.

In FIG. 10, reference numerals 1001 and 1021 denote a horizontal synchronous signal HD (the time between HD and HD corresponds to the period from the start of image signal readout of one line to the start of the next image signal readout of another line). Parts 1002, 1003, 1022, and 1023 of the pixel region of the imaging unit 4 include blocks repetitively containing R, G, G, and B pixels. The 1-line reset sequences in the driving mode A include periods 1004 and 1005 and periods 1006 and 1007, respectively. The 1-line reset sequences in the driving mode B include periods 1024 and 1025, periods 1026 to 1027, periods 1028 and 1029, and periods 1030 and 1031, respectively. The periods 1004, 1006, 1024, 1026, 1028, and 1030 are reset periods (RST). The periods 1005, 1007, 1025, 1027, 1029, and 1031 are empty periods. Even in the reset sequence, it is possible to adjust timings 1041, 1042, and 1043 in the driving modes A and B by inserting the empty periods 1005, 1007, 1025, 1027, 1029, and 1031. Hence, reset can be done at almost the same timing based on the vertical position in the driving modes A and B.

In any other driving, it is possible to execute reset and readout at almost the same timing based on the vertical position by inserting empty periods.

As described above, according to this embodiment, it is possible to execute reset and readout at the same timing with respect to the vertical position of the CMOS image sensor independently of the driving mode (mode). Consequently, the storage time can remain almost constant even when switching the driving mode. This prevents any brightness difference between the top and bottom of the screen and also prevents drop frame due to a frame loss in EVF display or a moving image process such as moving image recording, a correction process for the brightness difference, and degradation of image quality.

Modification to First Embodiment

FIG. 11 is a diagram showing a readout sequence in a case where timing adjustment is performed by changing the clock frequency and inserting empty periods. This modification is the same as the first embodiment in that the storage time remains almost constant by executing reset and readout at almost the same timing with respect to the vertical position of the CMOS image sensor. However, this modification is different from the first embodiment in that the control unit that executes reset and readout at almost the same timing with respect to the vertical position of the CMOS image sensor uses a change in synchronous clock frequency for the CMOS image sensor.

In FIG. 11, reference numerals 1101 and 1121 denote synchronous clocks for the CMOS image sensor. Reference numerals 1101 and 1122 denote a horizontal synchronous signal HD. Parts 1103, 1104, 1123, and 1124 of the pixel region of the imaging unit 4 include blocks repetitively containing R, G, G, and B pixels. The 1-line readout sequences in the driving mode A include periods 1105 to 1108 and periods 1109 to 1112, respectively. The 1-line readout sequences in the driving mode B include periods 1125 to 1127, periods 1128 to 1130, periods 1131 to 1133, and periods 1134 to 1136, respectively. The periods 1105, 1107, 1109, 1111, 1125, 1128, 1131, and 1134 are horizontal blanking periods (HBLK). The periods 1106 and 1110 are periods (Skip) necessary for thinning out one line. The periods 1108, 1112, 1126, 1129, 1132, and 1135 are horizontal readout periods represented by number of horizontal pixels×reference clock time. The periods 1127, 1130, 1133, and 1136 are empty periods.

The electronic zoom magnification in the driving mode B is twice that in the driving mode A. That is, the bold frame 102 in FIG. 1A indicates the readout region in the driving mode A, while the central portion 103 in FIG. 1B indicates the readout region in the driving mode B. The number of vertical readout lines in the driving mode B is twice that in the driving mode A. To shorten the vertical readout period of the CMOS image sensor, the synchronous clock 1121 for the CMOS image sensor in the driving mode B has a higher frequency that that of the synchronous clock 1101 for the CMOS image sensor in the driving mode A. Periods 1141 to 1142 and 1142 to 1143 of two lines in the driving mode B are adjusted to the periods 1141 to 1142 and 1142 to 1143 of one line in the driving mode A. In the driving mode B, the empty periods 1127, 1130, 1133, and 1136 are inserted in the readout sequence. Hence, it is possible to execute readout at almost the same timing based on the vertical position of the CMOS image sensor in the driving modes A and B.

Figure 12:
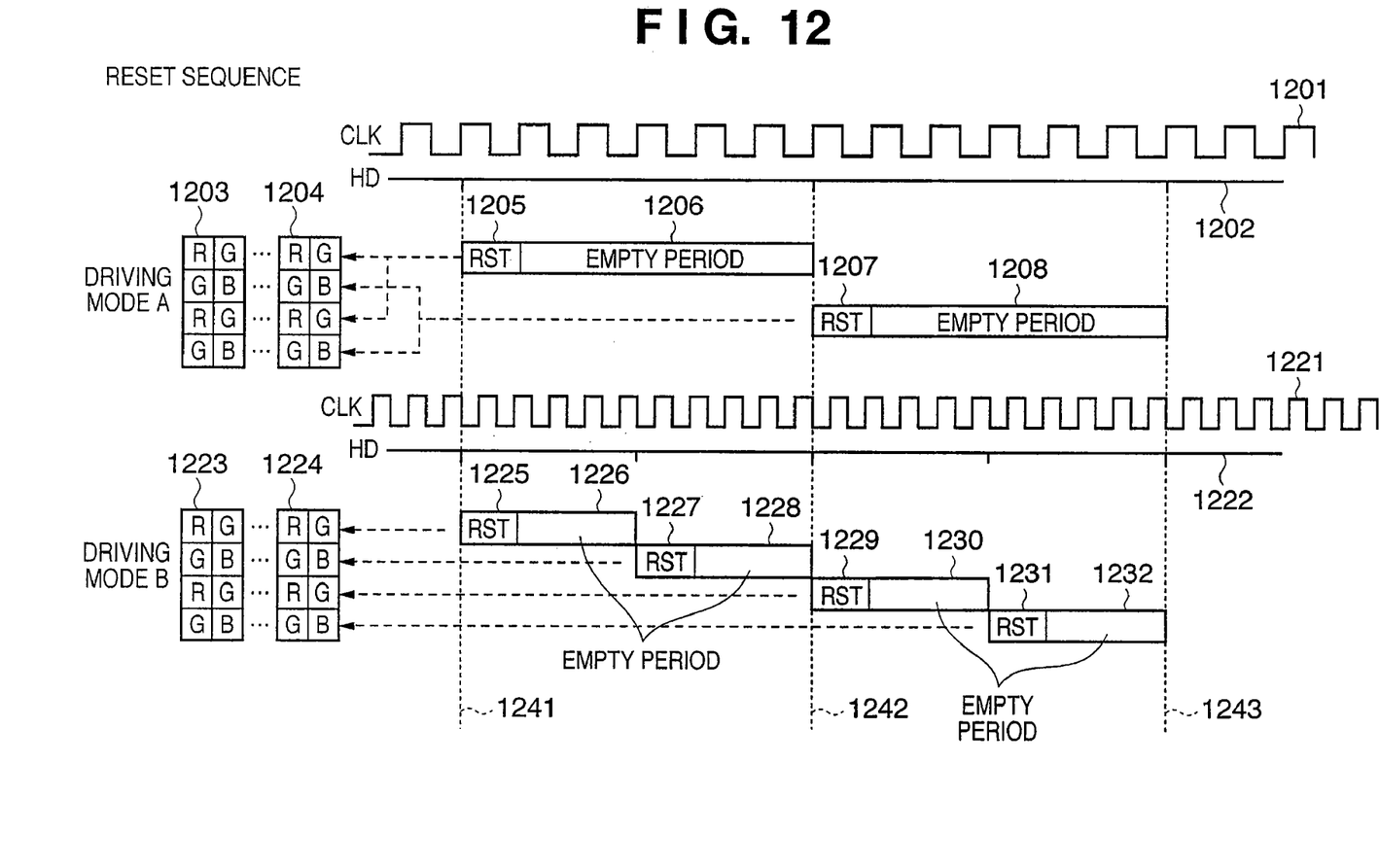
FIG. 12 is a diagram showing a reset sequence in a case where timing adjustment is performed by changing clock frequency and inserting an empty period.

FIG. 12 is a diagram showing a reset sequence in a case where timing adjustment is performed by changing the clock frequency and inserting empty periods. In FIG. 12, reference numerals 1201 and 1221 denote synchronous clocks for the CMOS image sensor. Reference numerals 1201 and 1222 denote a horizontal synchronous signal HD. Parts 1203, 1204, 1223, and 1224 of the pixel region of the imaging unit 4 include blocks repetitively containing R, G, G, and B pixels. The 1-line reset sequences in the driving mode A include periods 1205 and 1206 and periods 1207 and 1208, respectively. The 1-line reset sequences in the driving mode B include periods 1225 to 1228, and periods 1229 to 1232, respectively. The periods 1205, 1207, 1225, 1227, 1229, and 1231 are reset periods (RST). The periods 1206, 1208, 1226, 1229, 1230, and 1232 are empty periods. Even in the reset sequence, it is possible to adjust timings 1241, 1242, and 1243 in the driving modes A and B by inserting the empty periods 1206, 1208, 1226, 1228, 1230, and 1232. Hence, reset can be done at almost the same timing based on the vertical position of the CMOS image sensor in the driving modes A and B.

In any other driving, it is possible to execute reset and readout at almost the same timing based on the vertical position of the CMOS image sensor by changing the frequency of the synchronous clock for the CMOS image sensor and inserting empty periods.

As described above, according to the modification to the first embodiment, it is possible to execute reset and readout at the same timing on the basis of the vertical position of the CMOS image sensor independently of the driving mode. Consequently, the storage time can remain almost constant even when switching the driving mode. This prevents any brightness difference between the top and bottom of the screen and also prevents drop frame due to a frame loss in EVF display moving image processing such as moving image recording, correction processing for the brightness difference, and degradation of image quality.

In the first embodiment, the readout period per frame is long because an empty period is inserted in the readout period and reset period in correspondence with driving in the longest readout period in the vertical direction of the CMOS image sensor. The modification allows a reduction in the readout period by raising the frequency of the synchronous clock for the CMOS image sensor.

Second Embodiment

As a characteristic feature of the present invention, the second embodiment of a method of unifying the storage time in a frame when the driving mode changes, for example, due to a change in electronic zoom magnification will be described.

In the first embodiment and its modification, the storage time in a frame is unified by executing reset and readout at the same timing with respect to the vertical position of the CMOS image sensor independently of the driving mode, as shown in FIG. 8. In the second embodiment, the storage time in a frame is unified by executing reset and readout at the same for a readout target line. At this time, the readout period and reset period are constant.

Figure 13:
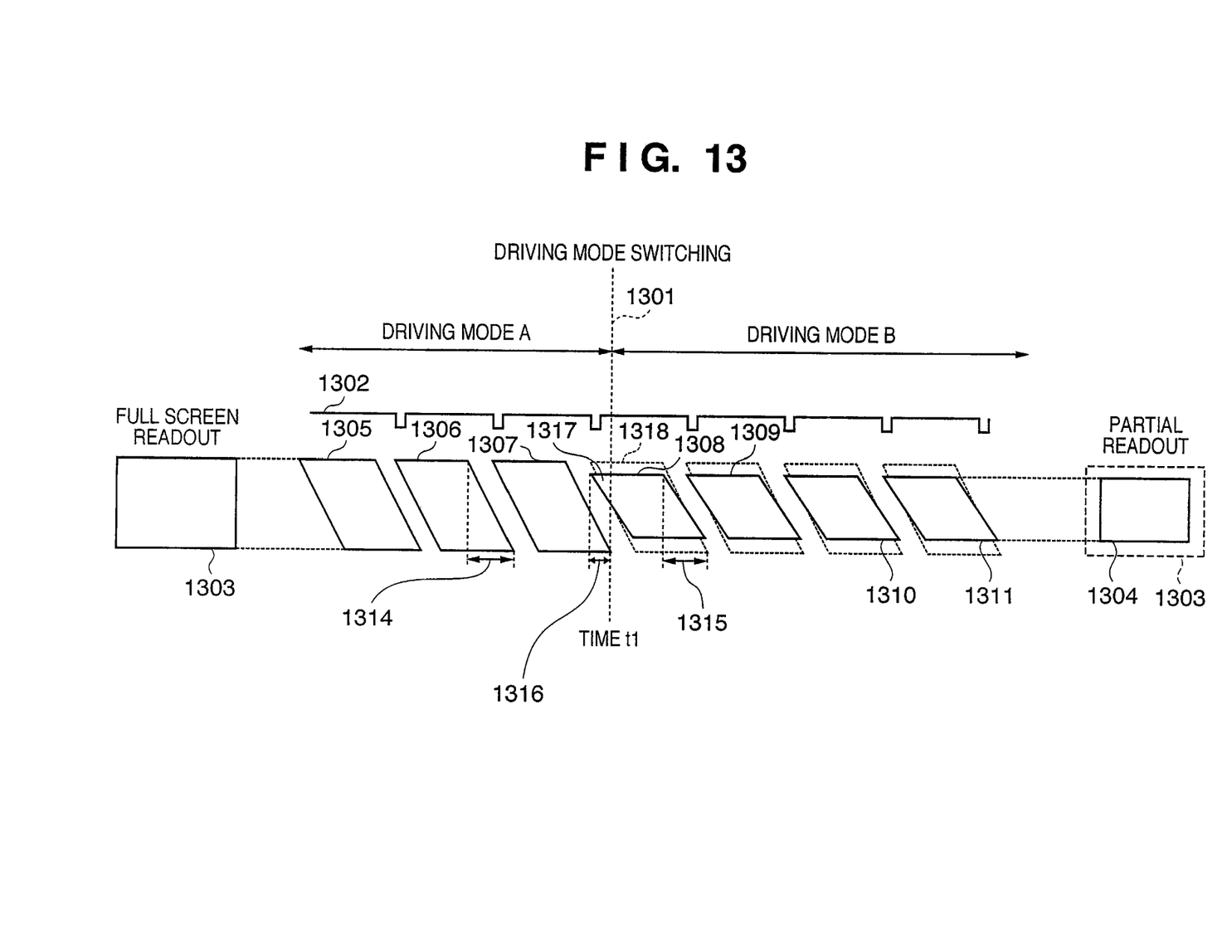
FIG. 13 is an overall diagram showing reset and readout performed at the same timing for a target readout line.

FIG. 13 is an overall diagram showing reset and readout performed at the same timing for a target readout line. In FIG. 13, the abscissa represents the time, and the ordinate represents the readout position in the CMOS image sensor. Frames 1305 to 1311 represent storage timings and storage times at line positions in each driving. FIG. 13 shows the storage times of the frames 1305 to 1311 when the CMOS image sensor is driven in a driving mode A up to a time t1 (1301) and then driven in a driving mode B from the time t1 (1301). Reference numeral 1302 indicates a vertical synchronous signal VD. In the driving mode A, the sensor executes full screen readout 1303. In the driving mode B, the sensor executes partial readout 1304. FIG. 13 is different from FIG. 4 in that the reset period and readout period of the frames 1308 to 1311 do not change between the driving modes A and B on both sides of the time t1. That is, the storage time can remain constant. This operation is implemented by executing reset and readout at the same timing in the driving modes A and B based on the target readout line. To do this, upon drive switching 1301 at the time t1, reset for a reset period 1317 of the frame 1308 before the time t1 is executed in advance with respect to the readout region in the driving mode B.

As described above, according to the second embodiment, it is possible to execute reset and readout at the same timing for the target readout line independently of the driving mode. This prevents any brightness difference between the top and bottom of the screen and also prevents frame drop due to a frame loss in EVF display or a moving image process such as moving image recording, correction processing for the brightness difference, and degradation of image quality.

In the first and second embodiments, two lines are added in the driving mode A. Instead, one of the two lines may be thinned out.

In the driving mode A, the sensor reads out the full screen by adding two lines. In the driving mode B, the sensor reads out some of lines without addition. Instead, the sensor may read out the full screen by adding four lines in the driving mode A and read out some of lines without addition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-183848, filed Jul. 3, 2006, which is hereby incorporated by reference herein in its entirety.

What is claimed is:

1. An imaging apparatus comprising:
an image sensing unit in which a plurality of photoelectric conversion elements are arranged on an image sensing plane; and
a control unit, wherein
the control unit has a first mode in which image signals of each of the M lines in a first photoelectric conversion element group arranged in a first region of the image sensing plane are read out from the image sensing unit; and a second mode in which image signals of each of the N lines in a second photoelectric conversion element group arranged in a second region that is smaller than the first region of the image sensing plane are read out from the image sensing unit, wherein M is an integer greater than N, and N is an integer less than M and greater than or equal to 1; and
performing control to cause a horizontal period of the second mode to be N/M of that of the first mode, wherein
the horizontal period of the first mode is a period from the start of image signal readout of a predetermined line to the start of the image signal readout of a next predetermined line, and
the horizontal period of the second mode is a period from the start of image signal readout of a predetermined line to the start of the image signal readout of a next predetermined line.

2. An imaging apparatus according to claim 1, wherein the control unit performs control so as to cause reset timing and readout timing of each of the first and second modes to be constant when switching between the two modes.

3. An imaging apparatus according to claim 2, wherein the control unit sets empty period during the horizontal period of the readout of one line from the image sensing unit in the first mode.

4. An imaging apparatus according to claim 2, wherein the control unit performs control so as to cause the number of readout lines in the first mode is equal to that of readout lines in the second mode.

5. An imaging apparatus according to claim 4, wherein the control unit performs reset operation within a readout period before switching on a readout region after switching when switching between the two modes.

6. An imaging apparatus according to claim 1, wherein the control unit performs readout of one of the M lines of the image sensing unit by adding image signals of at least two lines of the M lines.

7. An imaging apparatus according to claim 1, wherein the control unit performs readout of one of the M lines of the image sensing unit by thinning out image signals of M−1 lines from the M lines.

8. An imaging system comprising:
an optical system; and
an imaging apparatus including,
an image sensing unit in which a plurality of photoelectric conversion elements are arranged on an image sensing plane; and
a control unit, wherein
the control unit has a first mode in which image signals of each of the M lines in a first photoelectric conversion element group arranged in a first region of the image sensing plane are read out from the image sensing unit; and a second mode in which image signals of each of the N lines in a second photoelectric conversion element group arranged in a second region that is smaller than the first region of the image sensing plane are read out from the image sensing unit, wherein M is an integer greater than N, and N is an integer less than M and greater than or equal to 1; and
performing control to cause a horizontal period of the second mode to be N/M of that of the first mode, wherein
the horizontal period of the first mode is a period from the start of image signal readout of a predetermined line to the start of the image signal readout of a next predetermined line, and the horizontal period of the second mode is a period from the start of image signal readout of a predetermined line to the start of the image signal readout of a next predetermined line.

9. A method for controlling an imaging apparatus that comprises an image sensing unit in which a plurality of photoelectric conversion elements are arranged on an image sensing plane, and a control unit, wherein the control unit has a first mode in which image signals of each of the M lines in a first photoelectric conversion element group arranged in a first region of the image sensing plane are read out from the image sensing unit; and a second mode in which image signals of each of the N lines in a second photoelectric conversion element group arranged in a second region that is smaller than the first region of the image sensing plane are read out from the image sensing unit, wherein M is an integer greater than N, and N is an integer less than M and greater than or equal to 1, the method comprising a step of:

performing control to cause a horizontal period of the second mode to be N/M of that of the first mode, wherein the horizontal period of the first mode is a period from the start of image signal readout of a predetermined line to the start of the image signal readout of a next predetermined line, and the horizontal period of the second mode is a period from the start of image signal readout of a predetermined line to the start of the image signal readout of a next predetermined line.

* * * * *